United States Patent
Greer et al.

(10) Patent No.: US 9,294,438 B2
(45) Date of Patent: *Mar. 22, 2016

(54) CLOUD COMPUTING METHOD AND SYSTEM

(71) Applicant: LOCKHEED MARTIN CORPORATION, Bethesda, VA (US)

(72) Inventors: Melvin Greer, Ashburn, VA (US); John W. Ngo, Pottstown, PA (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/274,301

(22) Filed: May 9, 2014

(65) Prior Publication Data

US 2014/0250519 A1 Sep. 4, 2014

Related U.S. Application Data

(63) Continuation of application No. 13/112,758, filed on May 20, 2011, now Pat. No. 8,762,709.

(51) Int. Cl.
*H04L 29/06* (2006.01)
*H04L 9/32* (2006.01)

(52) U.S. Cl.
CPC .............. *H04L 63/02* (2013.01); *H04L 9/3231* (2013.01)

(58) Field of Classification Search
CPC .................. G06F 21/32; G06F 21/305; G06F 2221/2147; H04L 63/0861; H04L 9/3231; H04W 12/06; H04W 12/08
See application file for complete search history.

(56) References Cited

U.S. PATENT DOCUMENTS

| | | | |
|---|---|---|---|
| 6,182,076 B1 | 1/2001 | Yu et al. | |
| 7,249,177 B1 | 7/2007 | Miller | |
| 7,574,496 B2 | 8/2009 | McCrory et al. | |
| 7,636,764 B1 | 12/2009 | Fein et al. | |
| 8,099,604 B2 | 1/2012 | Aikawa et al. | |
| 8,438,385 B2* | 5/2013 | Song et al. | 713/156 |
| 2003/0172270 A1* | 9/2003 | Newcombe et al. | 713/168 |
| 2004/0010697 A1 | 1/2004 | White | |
| 2004/0177097 A1* | 9/2004 | Yu et al. | 707/104.1 |
| 2005/0177647 A1* | 8/2005 | Anantha et al. | 709/249 |
| 2007/0061590 A1 | 3/2007 | Boye et al. | |
| 2007/0195998 A1 | 8/2007 | Le Saint | |
| 2008/0255928 A1* | 10/2008 | Tomeny | 705/10 |
| 2009/0164798 A1 | 6/2009 | Gupta | |

(Continued)

*Primary Examiner* — Dede Zecher
*Assistant Examiner* — Abdullah Almamun
(74) *Attorney, Agent, or Firm* — Marsh Fischmann & Breyfogle LLP (57) ABSTRACT

Methods and systems integrating sensitive or private data with cloud computing resources while mitigating security, privacy and confidentiality risks associated with cloud computing. In one embodiment, a computer network system includes a firewall separating a public portion of the computer network from an on-premises portion of the computer network, a database storing private data behind the firewall, and a user device connected with the computer network. The user device accesses an application hosted in the public portion of the computer network. In response, the application generates return information. The user device receives the return information and generates a request for private data based on at least a portion of the returned information. The request is transmitted to the database which generates a response including the requested private data. The response is transmitted in an encrypted form from the database via the computer network to the user device.

12 Claims, 3 Drawing Sheets

(56) References Cited

U.S. PATENT DOCUMENTS

| | | |
|---|---|---|
| 2009/0228950 A1 | 9/2009 | Reed et al. |
| 2009/0300719 A1 | 12/2009 | Ferris |
| 2010/0169497 A1 | 7/2010 | Klimentiev et al. |
| 2010/0235903 A1 | 9/2010 | Carter et al. |
| 2010/0242102 A1 | 9/2010 | Cross et al. |
| 2012/0002791 A1 | 1/2012 | Kraus et al. |
| 2012/0054741 A1* | 3/2012 | Ali et al. .......................... 718/1 |
| 2012/0079579 A1 | 3/2012 | Kamakura |
| 2012/0166810 A1 | 6/2012 | Tao et al. |
| 2012/0317217 A1* | 12/2012 | Lavy et al. .................... 709/206 |

* cited by examiner

CLOUD COMPUTING METHOD AND SYSTEM

CROSS REFERENCE TO RELATED APPLICATIONS

This application is a continuation of and claims priority to U.S. patent application Ser. No. 13/112,758 entitled "CLOUD COMPUTING METHOD AND SYSTEM" and filed on May 20, 2011, the entirety of which is incorporated herein by reference.

FIELD OF THE INVENTION

The present invention relates generally to cloud computing, and more particularly to maintaining the security, privacy and confidentiality of data while allowing use of such data within a cloud computing environment.

BACKGROUND OF THE INVENTION

The provision of computing resources on an as-needed basis via publically accessible computer networks is often referred to as cloud computing. The adoption of cloud computing offers a number of potential advantages to users. By utilizing resources that are deployed, operated and maintained by third parties in the computer network or cloud, users of cloud computing resources can gain a number of advantages including speed, agility and lower costs as compared with relying on locally installed applications. However, some major concerns with the adoption of cloud computing within government and other enterprises include security, privacy and confidentiality concerns. In this regard, sensitive or private data that is maintained or used by such resources in the cloud can be vulnerable to be improper access or otherwise being compromised.

SUMMARY OF THE INVENTION

Accordingly, the present invention provides for the use of sensitive or private data within a cloud computing environment while mitigating security, privacy and confidentiality risks associated with cloud computing. The present invention provides an on-premise, cloud computing integration strategy that utilizes a service oriented architecture (SOA) integration framework and extends cloud capabilities to handheld/mobile devices. In accordance with the present invention, sensitive or private data is stored on-premises behind a firewall instead of being stored or replicated into the cloud. By emphasizing data separation which utilizes the security, certification/accreditation methods and privacy controls afforded by the on-premises environment, along with SOA and private key encryption and cryptography, the present invention achieves a unique capability that allows the use of cloud computing applications in connection with sensitive or private data.

According to one aspect, a method of using a cloud computing application within a computer network environment may include the step of storing private data in a database included in an on-premises portion of the computer network, with the on-premises portion being behind a firewall separating the on-premises portion of the computer network from a public portion of the computer network. The method may also include accessing an application hosted by one or more computer hardware platforms included in the public portion of the computer network. In this regard, the application may be accessed with a user device connected with the computer network. The user device may, for example, be connected with the public portion of the network, or it may, for example, be connected with a private portion of the computer network. As used herein, 'connected' or 'connection' does not necessarily imply that a first element (e.g., the user device) is physically connected (e.g. by a cable or the like) with a second element (e.g., the computer network), but rather that data may be transmitted between the first and second elements. Such connection may be facilitated by a cable, a wireless transceiver, or any other suitable means.

The method also may include receiving at the user device return information from the application. The method may further include transmitting a request for private data from the user device through the public portion of the computer network to the database of the on-premises portion of the computer network, wherein the request for private data is based on at least a portion of the returned information. The method may also include retrieving the requested private data from the database in response to the request.

The method may additionally include transmitting the retrieved private data in an encrypted form via the public portion of the computer network to the user device. In this regard, the method may include establishing a secure socket layer connection between the user device and the firewall for transmission of the retrieved private data via the public portion of the computer network.

The private data may, for example, be associated with one or more individuals and the application hosted by the one or more computer hardware platforms of the public portion of the computer network may, for example, comprise a biometric recognition application. In this regard, the method may further include obtaining a biometric sample (e.g., a facial image, an iris scan, a fingerprint or the like) associated with each of the one or more individuals, associating a unique identifier with each of the one or more individuals, submitting the biometric sample and the unique identifier associated with each of the one or more individuals to the biometric recognition application for enrollment with the biometric recognition application, and storing the unique identifier associated with each of the one or more individuals in the database of the on-premises portion. The method may also further include obtaining with the user device a biometric sample (e.g., a facial image, an iris scan, a fingerprint or the like) of an individual to be authenticated, transmitting the biometric sample of the individual to be authenticated to the biometric recognition application, and receiving at the user device return information from the biometric recognition application identifying one or more possible matches between the biometric sample of the individual to be authenticated and previously submitted biometric samples of the one or more individuals enrolled with the biometric recognition service. In the step of receiving at the user device return information from the biometric recognition application, the return information may comprise each unique identifier and biometric sample associated with each of the one or more individuals identified as a possible match, and in the step of transmitting from the user device a request based on the returned information for private data, the request may include the unique identifier associated with one of the one or more individuals identified as a possible match.

According to another aspect, a computer network system integrating secure data with public cloud computing capability may include a firewall separating a public portion of the computer network from an on-premises portion of the computer network, a database storing private data, wherein the database is included in the on-premises portion behind the firewall, and a user device connected with the computer network. The user device may, for example, be connected with the public portion of the network, or it may, for example, be connected with a private portion of the computer network. The user device may be configured to access a public cloud application hosted by one or more computer hardware platforms included in the public portion of the computer network, wherein the public cloud application is configured to generate return information after being accessed by the user device. The user device may further be configured to receive the return information and generate a request based on at least a portion of the returned information, wherein the request is transmitted through the public portion of the computer network to the database of the on-premises portion of the computer network. the database may be configured to generate a response including the requested private data, wherein the response is transmitted in an encrypted form from the database via the public portion of the computer network to the user device. In this regard, the system may further include a secure socket layer connection between the user device and the firewall for transmission of the retrieved private data via the public portion of the computer network.

The private data may, for example, be associated with one or more individuals and the application hosted by the one or more computer hardware platforms of the public portion of the computer network may, for example, comprise a biometric recognition application. In this regard, the system may also further include at least one computer hardware platform connected to the on-premises portion of the computer network, wherein the computer hardware platform is configured to obtain a biometric sample (e.g., a facial image, an iris scan, a fingerprint or the like) associated with each of the one or more individuals, associate a unique identifier with each of the one or more individuals, submit the biometric sample and the unique identifier associated with each of the one or more individuals to the biometric recognition application for enrollment with the biometric recognition application. The database may further be configured to store the unique identifier associated with each of the one or more individuals. The user device may further be configured to obtain a biometric sample (e.g., a facial image, an iris scan, a fingerprint or the like) of an individual to be authenticated, transmit the biometric sample of the individual to be authenticated to the biometric recognition application, and receive at the user device return information from the biometric recognition application identifying one or more possible matches between the biometric sample of the individual to be authenticated and previously submitted biometric samples of the one or more individuals enrolled with the biometric recognition service. The return information may comprise each unique identifier and biometric sample associated with each of the one or more individuals identified as a possible match, and the request may include the unique identifier associated with one of the one or more individuals identified as a possible match.

Various refinements exist of the features noted in relation to the various aspects of the present invention. Further features may also be incorporated in the various aspects of the present invention. These refinements and additional features may exist individually or in any combination, and various features of the various aspects may be combined. These and other aspects and advantages of the present invention will be apparent upon review of the following Detailed Description when taken in conjunction with the accompanying figures.

DESCRIPTION OF THE DRAWINGS

For a more complete understanding of the present invention and further advantages thereof, reference is now made to the following Detailed Description, taken in conjunction with the drawings, in which.

DETAILED DESCRIPTION

Figure 1:
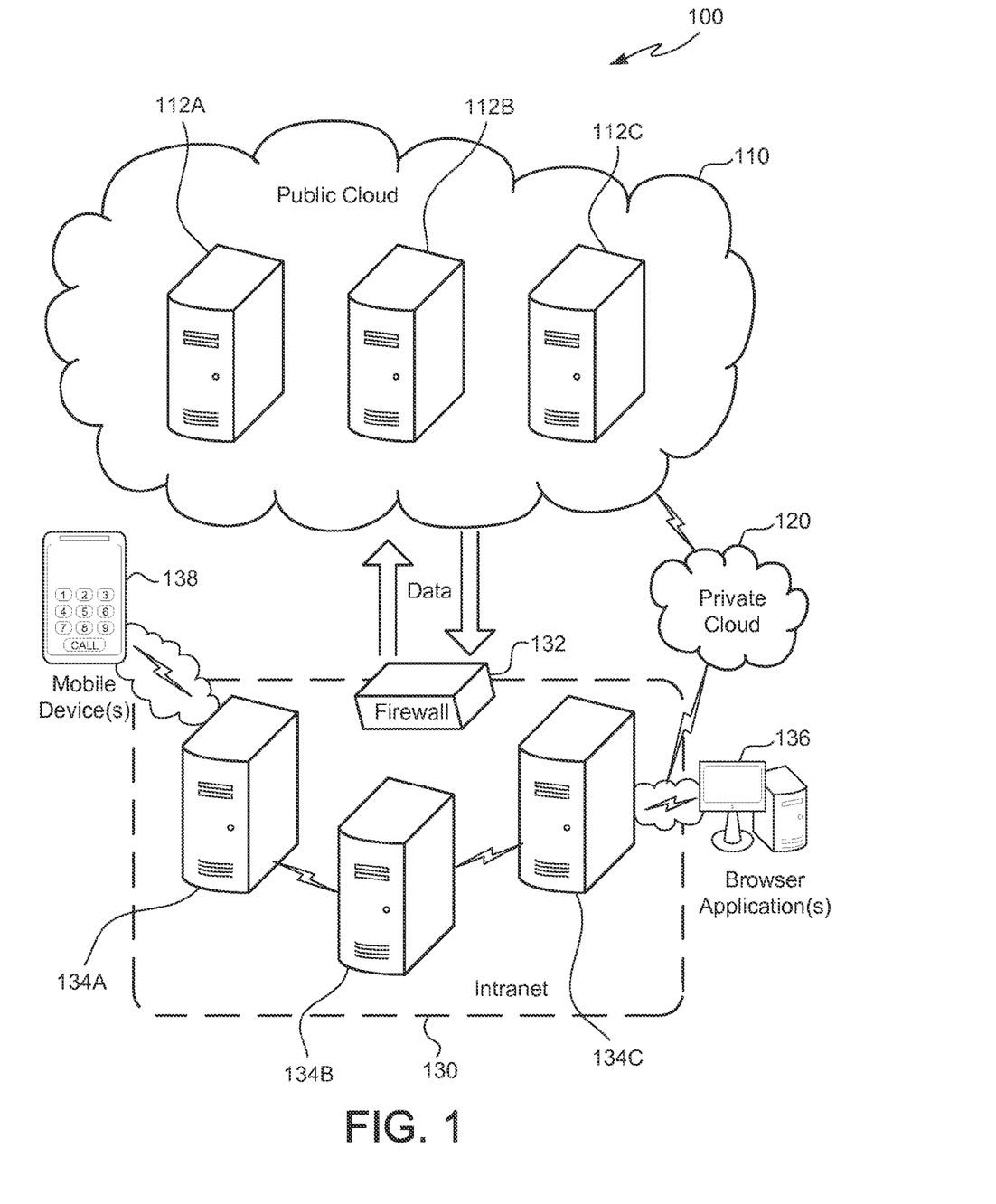
FIG. 1 shows one embodiment of a computer network system architecture in which a secure cloud computing design pattern may be utilized.

As illustrated in FIG. 1, a computer network system 100 includes a public cloud portion 110 of the network, a private cloud portion 120 of the network, and an on-premises portion 130 of the network. The public cloud portion 110, the private cloud portion 120 and the on-premises portion 130 may be in communication with one another via a publicly available computer network such as, for example, the Internet.

The public cloud 110 includes various applications provided by one or more computer hardware platforms such as, for example, a computer hardware platform 112A providing Windows Azure, a computer hardware platform 112B providing Amazon Web Services and a computer hardware platform 112C providing the Google App Engine. Although FIG. 1 shows three public cloud 110 computer hardware platforms 112A-12C, there may be fewer or more computer hardware platforms in the public cloud 110 providing various public cloud 110 applications that are included in the system 100.

The private cloud 120 may be interconnected for communication with the public cloud 110 and the on-premises portion 130. The private cloud 120 may also include one or more applications provided by one or more computer hardware platforms (not shown). Private cloud 120 applications may only be accessible to authorized users via password requirements and/or other user authentication processes.

The on-premises portion 130 includes a firewall 132 and one or more computer hardware platforms 134A-134C. The computer hardware platforms 134A-134C of the on-premises portion 130 may be in communication with one another and with the firewall 132 via a private computer network such as an intranet. One or more of the computer hardware platforms 134A-134C of the on-premises portion 130 may also be in communication with one or more user computing devices 136 (e.g. desktop and laptop computers and the like) and one or more user mobile devices 138 (e.g., cellular phones, pad computing devices, personnel digital assistants and the like). In this regard, a service-oriented architecture (SOA) integration framework may be used to leverage Wi-Fi and 3/4G networks to extend cloud application reach to mobile and wireless devices.

Figure 2:
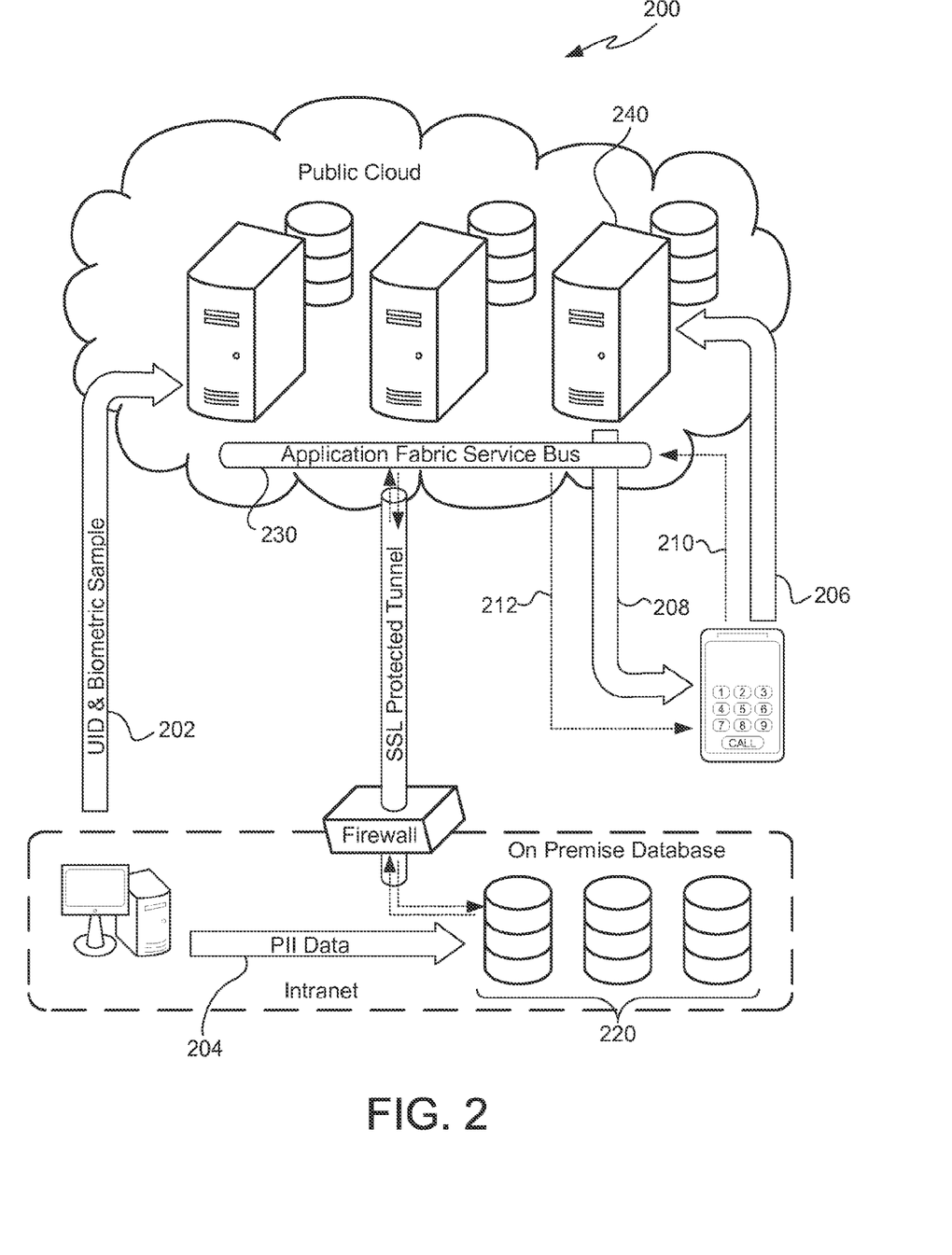
FIG. 2 depicts the flow of data within one embodiment of a biometric identity management process implemented within a computer network system in accordance with the secure cloud computing design pattern.

FIG. 2 shows the flow of data during a biometric identity management process 200 implemented within a network system 100 such as illustrated in FIG. 1 in accordance with the cloud computing design pattern. In a first step 202 of the process 200, a user computing device 136 connected to the on-premises portion 130 of the network system 100 is operated to submit to the public cloud 110 unique identifiers and biometric samples associated with one or more known individuals for enrollment with a biometric recognition service hosted by one or more of the computer hardware platforms 112A-112C of the public cloud 110. In this regard, each unique identifier may for example, comprise, a text string comprising a combination of letters, numbers and/or characters, each biometric sample may, for example, comprise a photograph of a known individual's face, and the biometric recognition service may, for example, comprise a facial recognition service. Other types of biometric samples and biometric recognition services such as, for example, iris scans and/or fingerprints may be used in combination with or instead of photographs of faces and facial recognition. Once enrolled, the submitted biometric samples are used by the biometric recognition service for authenticating matches with biometric samples obtained from unknown individuals.

In a second step 204 of the process 200, personal identifiable information associated with the individual(s) providing the biometric sample(s) is stored in a database 220 included in the on-premises portion 130. The on-premises database 220 may, for example, be maintained by one or more of the computer hardware platforms 134A-134C of the on-premises portion 130. The personal identifiable information may include various information associated with the individual(s) providing the biometric sample(s) including, for example, a social security number, a birth date, a home address and/or an e-mail address.

In a third step 206 of the process 200, a user device 138 such as a mobile phone is used to obtain and upload a biometric sample associated with an unknown individual to the biometric recognition service of the public cloud portion 110. In this regard, the user device 138 may be used to obtain a photo of the unknown individual's face and upload the photo to the facial recognition service of the public cloud 110.

In a fourth step 208 of the process 200, after the biometric recognition service processes the uploaded biometric sample, the biometric recognition service responds to the user device 138 with the unique identifier(s) associated with one or more known enrolled individuals whose biometric samples are possible matches for the biometric sample uploaded from the user device. In this regard, the biometric recognition service may, for example, respond with the top three matches.

In a fifth step 210 of the process 200, the user device 138 makes a request for the personal identifiable information associated with the known individual(s) that are identified as possible matches by the biometric recognition service. The request is made through a relay endpoint in an application fabric service bus 230 of the public cloud portion 110. The relay endpoint then routes the request to the data service of the on-premises portion 130 via a secure socket layer (SSL) protected tunnel connection and firewall 132 of the on-premises portion 130.

In a sixth step 212 of the process 200, the data service of the on-premises portion 130 locates and retrieves the requested personal identifiable information associated with the known individual(s) from the on-premises database 220. The personal identifiable information is then routed to the user device 138 via the firewall 132 of the on-premises portion 130, the SSL protected tunnel connection, and the application fabric service bus 230 of the public cloud 110.

Figure 3:
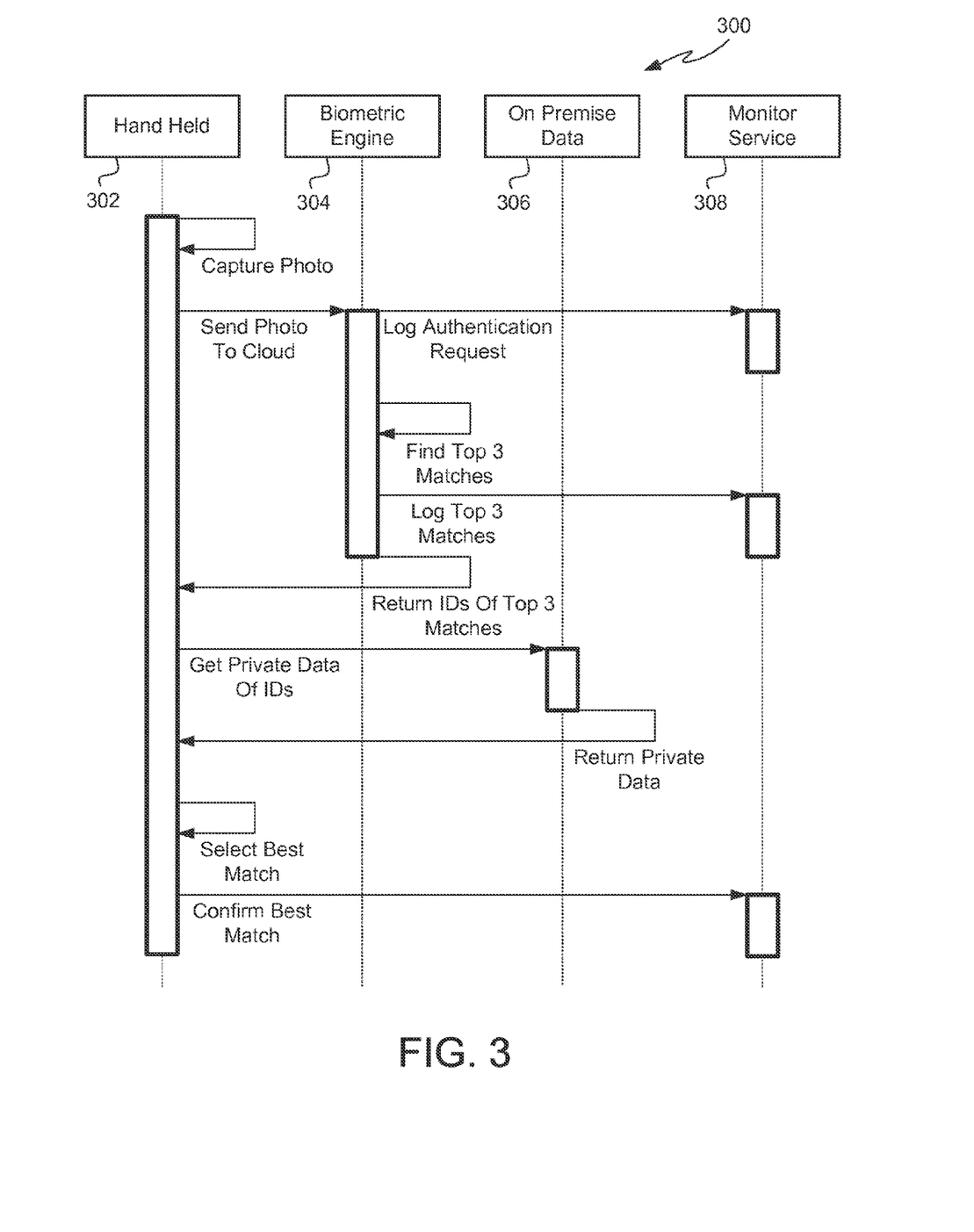
FIG. 3 is a sequence diagram representing the interaction of different components involved in a biometric enabled identity management process such as shown in FIG. 2.

FIG. 3 shows a unified modeling language (UML) sequence diagram 300 representing the interaction of the different components involved in a biometric enabled identity management process 200 such as shown in FIG. 2. The components include the user device 302 (e.g., a hand-held mobile device 138 such as in FIGS. 1 and 2), the biometric engine 304 (e.g., hosted on one or more computer hardware platforms 134A-134C of the public cloud 130 such as shown in FIGS. 1 and 2), on-premises database 306 (e.g., an on-premises database 220 such as shown in FIG. 2), and a monitor service 308. The user device 302 obtains the biometric sample (e.g. a photo) of the unknown individual and sends the sample to the biometric engine 304 for authentication. The biometric engine 304 logs the authentication request with the monitor service 308, finds one or more (e.g. the top three) matches for the biometric sample of the unknown individual, logs the match(es) with the monitor service 308, and returns the unique identifiers of the match(es) to the user device 302. The user device 302 requests from the on-premises database 308 the personal identifiable information associated with the unique identifier(s) returned as the best match(es) by the biometric engine 304. The on-premises database 306 returns the personal identifiable data in a secure encrypted form to the user device 302. Based, for example, on some or all of the returned personal identifiable information, a selection is made with the user device 302 of the best match for the identity of the unknown individual and a confirmation of the best match is sent to the monitor service 308. Thus personal identifiable information is not stored in the public cloud 110 and is only routed via the public cloud 130 in a secure encrypted form from the on-premises database 306 to the user device 302 while the public cloud biometric engine 304 is engaged by the user device 302 to identify potential matches from the unknown individual.

Deviations may be made from the specific embodiments disclosed in the specification without departing from the spirit and scope of the invention. For example, at least some of the functionalities performed by many of the processes, devices and components discussed herein may be performed by other components, devices, processes, etc. The illustrations and discussion herein has only been provided to assist the reader in understanding the various aspects of the present disclosure.

Furthermore, the secure cloud computing design pattern disclosed herein is not limited to being used in the context of a biometric based enrollment and authentication process. Numerous other contexts for use and/or implementation of such secure cloud computing design pattern are envisioned (e.g., any cloud computing application engaged by a user device that involves delivery of private data to the user device).

Also, the various processes, devices, components and the like disclosed herein may be in the form of any appropriate combination of hardware, software, middleware, firmware and/or the like operable to carry out the various functionalities disclosed herein. For instance, such software, middleware and/or firmware may be implemented as one or more computer program products, i.e., one or more modules of computer program instructions encoded on a computer-readable medium for execution by one or more processors or processing modules, or to control the operation of, one or more data processing apparatuses. For example, the on-premises database 220, application fabric service bus 230, and biometric engine 240 of FIG. 2 may be provided in such computer-readable medium and executed by a processor or the like. The computer-readable medium can be a machine-readable storage device (e.g., a memory module), a machine-readable storage substrate, a memory device, a composition of matter affecting a machine-readable propagated signal, or a combination of one or more of them. In addition to hardware, code that creates an execution environment for the computer program in question, e.g., code that constitutes processor firmware, a protocol stack, a database management system, an operating system, or a combination of one or more of them may be involved.

A computer program (also known as a program, software, software application, script, or code) used to provide the functionality described herein may be written in any form of programming language, including compiled or interpreted languages, and may be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by an information flow network.

The block diagrams, processes, protocols and logic flows described in this specification can be performed by one or more programmable processors executing one or more computer programs to perform functions by operating on input data and generating output. The processes and logic flows can also be performed by, and apparatuses can also be implemented as, special purpose logic circuitry, e.g., an FPGA (field programmable gate array) or an ASIC (application-specific integrated circuit). Processors suitable for the execution of a computer program include, by way of example, both general and special purpose microprocessors, and any one or more processors of any kind of digital computer. Generally, a processor will receive instructions and data from a read-only memory or a random access memory or both. Generally, the elements of a computer are a processor for performing instructions and one or more memory devices for storing instructions and data. The techniques described herein may be implemented by a computer system configured to provide the functionality described.

In some embodiments, the network system 100 may include one or more of various types of devices, including, but not limited to a personal computer system, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, or, in general, any type of computing or electronic device.

Typically, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, a digital camera, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry. To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this disclosure contains many specifics, these should not be construed as limitations on the scope of the disclosure or of what may be claimed, but rather as descriptions of features specific to particular embodiments of the disclosure. Certain features that are described in this specification in the context of separate embodiments and/or arrangements can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Additionally, the foregoing description of the present invention has been presented for purposes of illustration and description. Furthermore, the description is not intended to limit the invention to the form disclosed herein. Consequently, variations and modifications commensurate with the above teachings, and skill and knowledge of the relevant art, are within the scope of the present invention. The embodiments described hereinabove are further intended to explain best modes known of practicing the invention and to enable others skilled in the art to utilize the invention in such, or other embodiments and with various modifications required by the particular application(s) or use(s) of the present invention. It is intended that the appended claims be construed to include alternative embodiments to the extent permitted by the prior art.

What is claimed is:

1. A method of using a cloud computing application within a computer network environment, said method comprising the steps of:

transmitting, from a mobile handheld device connected with the computer network to a biometric recognition application hosted by one or more computer hardware platforms included in a public portion of the computer network, at least one biometric sample of an individual to be authenticated, wherein operating the mobile handheld device is connected to the computer network via at least one of a Wi-Fi network connection, a cellular telephone network connection and a satellite network connection;

receiving, at the mobile handheld device from the biometric recognition application, a plurality of unique identifiers that respectively identify a plurality of previously submitted biometric samples of a plurality of individuals that have previously enrolled with the biometric recognition application, wherein the previously submitted biometric samples are possible matches to the biometric sample of the individual to be authenticated;

transmitting, from the mobile handheld device through the public portion of the computer network to a database of an on-premises portion of the computer network, a request for private data stored in the database that is associated with one or more of the individuals that have previously been enrolled with the biometric recognition application, wherein the request for private data includes one or more of the plurality of received unique identifiers, and wherein the on-premises portion is behind a firewall separating the on-premises portion of the computer network from the public portion of the computer network; and receiving, at the mobile handheld device from the database via the public portion of the computer network, the requested private data in an encrypted form.

2. The method of Claim 1 further comprising:
establishing a secure socket layer connection between the mobile handheld device and the firewall for transmission of the retrieved private data via the public portion of the computer network.

3. The method of Claim 1 further comprising:
obtaining a biometric sample associated with each of the one or more individuals;
associating a unique identifier with each of the one or more individuals;
submitting the biometric sample and the unique identifier associated with each of the one or more individuals to the biometric recognition application for enrollment with the biometric recognition application; and
storing the unique identifier associated with each of the one or more individuals in the database of the on-premises portion.

4. The method of claim 1 wherein in said step of accessing with a user device, the user device is connected with the public portion of the computer network.

5. The method of claim 1 wherein in said step of accessing with a user device, the user device is connected with a private portion of the computer network.

6. The method of claim 1 further comprising:
selecting, with the user device based on at least some of the received private data, a match between the individual to be authenticated and one of the individuals that have previously been enrolled with the biometric recognition application.

7. A computer network system integrating secure data with public cloud computing capability, said system comprising:
a firewall separating a public portion of the computer network from an on-premises portion of the computer network;
a database storing private data associated with one or more individuals, wherein the database is included in the on-premises portion behind the firewall; and
a mobile handheld device connected with the computer network, the mobile handheld device being configured to transmit at least one biometric sample of an individual to be authenticated to a public cloud biometric recognition application hosted by one or more computer hardware platforms included in the public portion of the computer network, wherein the public cloud biometric recognition application is configured to identify one or more unique identifiers that identify one or more previously submitted biometric samples of one or more individuals that have previously been enrolled with the biometric recognition application in response to receipt of the transmitted biometric sample, wherein the previously submitted biometric samples are possible matches to the biometric sample of the individual to be authenticated, and wherein the mobile handheld device is connected to the computer network via at least one of a Wi-Fi network connection, a cellular telephone network connection and a satellite network connection;
said mobile handheld device being further configured to receive the one or more unique identifiers that identify the one or more previously submitted biometric samples of the one or more individuals that have previously been enrolled with the biometric recognition application and generate a request for private data based on the one or more unique identifiers, wherein the request is transmitted through the public portion of the computer network to the database of the on-premises portion of the computer network; and
said database being configured to generate a response including the requested private data, wherein the response is transmitted in an encrypted form from the database via the public portion of the computer network to the mobile handheld device.

8. The system of claim 7 further comprising:
a secure socket layer connection between the mobile handheld device and the firewall for transmission of the retrieved private data via the public portion of the computer network.

9. The system of claim 7 further comprising:
at least one computer hardware platform connected to the on-premises portion of the computer network, wherein the computer hardware platform is configured to obtain a biometric sample associated with each of the one or more individuals, associate a unique identifier with each of the one or more individuals, and submit the biometric sample and the unique identifier associated with each of the one or more individuals to the biometric recognition application for enrollment with the biometric recognition application; and
said database being further configured to store the unique identifier associated with each of the one or more individuals.

10. The system of claim 7 wherein the user device is connected with the public portion of the computer network.

11. The system of claim 7 wherein the user device is connected with a private portion of the computer network.

12. The system of claim 7 wherein the mobile handheld device is configured to select, based on at least some of the received private data, a match between the individual to be authenticated and one of the individuals that have previously been enrolled with the biometric recognition application.

* * * * *

UNITED STATES PATENT AND TRADEMARK OFFICE
CERTIFICATE OF CORRECTION

PATENT NO.       : 9,294,438 B2                                   Page 1 of 1
APPLICATION NO.  : 14/274301
DATED            : March 22, 2016
INVENTOR(S)      : Greer et al.

It is certified that error appears in the above-identified patent and that said Letters Patent is hereby corrected as shown below:

In the claims

Claim 1

Column 8, line 43, delete "operating"

Signed and Sealed this
Twenty-eighth Day of June, 2016

Michelle K. Lee
*Director of the United States Patent and Trademark Office*